(12) United States Patent
Askew

(10) Patent No.: US 8,307,630 B2
(45) Date of Patent: Nov. 13, 2012

(54) ENGINE EXHAUST SYSTEM HAVING A PLURALITY OF DIESEL PARTICULATE FILTERS

(75) Inventor: Gerald W. Askew, Fort Wayne, IN (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 356 days.

(21) Appl. No.: 12/629,591

(22) Filed: Dec. 2, 2009

(65) Prior Publication Data

US 2011/0126524 A1 Jun. 2, 2011

(51) Int. Cl.
*F01N 5/04* (2006.01)
*F01N 3/00* (2006.01)
*F02D 23/00* (2006.01)

(52) U.S. Cl. .............. 60/280; 60/286; 60/287; 60/295; 60/602

(58) Field of Classification Search .............. 60/280, 60/247, 286, 303, 287, 292, 295, 297, 311, 60/324
See application file for complete search history.

(56) References Cited

U.S. PATENT DOCUMENTS

| | | | |
|---|---|---|---|
| 4,054,417 A | 10/1977 | Rosebrock | |
| 4,923,484 A | 5/1990 | Saito | |
| 6,276,139 B1* | 8/2001 | Moraal et al. | 60/605.2 |
| 2007/0193269 A1* | 8/2007 | Endres et al. | 60/605.1 |
| 2007/0220866 A1* | 9/2007 | Nishiumi | 60/286 |
| 2008/0087006 A1* | 4/2008 | Wu et al. | 60/280 |
| 2009/0007546 A1* | 1/2009 | Ueda et al. | 60/286 |
| 2009/0120070 A1* | 5/2009 | Hirata et al. | 60/286 |
| 2011/0131978 A1* | 6/2011 | Okada | 60/602 |

* cited by examiner

*Primary Examiner* — Thomas Denion
*Assistant Examiner* — Abdul Elnoubi
(74) *Attorney, Agent, or Firm* — Mark C. Bach; Jeffrey P. Calfa

(57) ABSTRACT

An exhaust system for an internal combustion engine comprises a turbocharger, an exhaust pipe, a first diesel particulate filter, a second diesel particulate filter, and a flow control valve. The exhaust pipe has a first portion, a second portion, and a third portion. At least the second portion of the exhaust pipe comprises a plurality of fluid paths. The first diesel particulate filter is coupled to on one of the plurality of fluid paths between the second portion and the third portion of the exhaust pipe. The second diesel particulate filter is coupled to another of the plurality of fluid paths. The flow control valve is disposed within the second portion of the exhaust pipe. The flow control valve is response to an input signal indicative of an operating condition and is configured to control exhaust flow to the first diesel particulate filter and the second diesel particulate filter in response to the input signal.

9 Claims, 1 Drawing Sheet

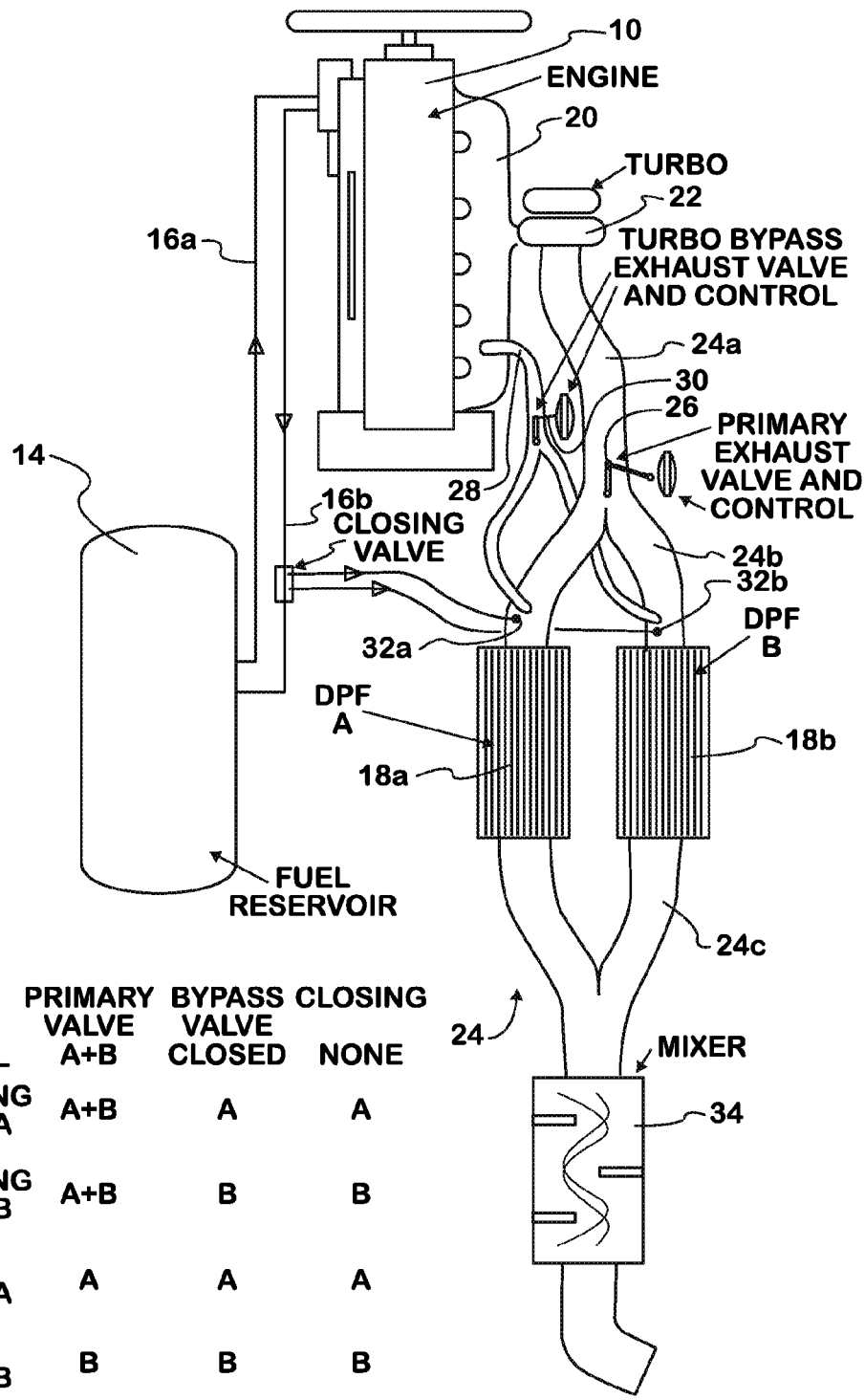

ENGINE EXHAUST SYSTEM HAVING A PLURALITY OF DIESEL PARTICULATE FILTERS

TECHNICAL FIELD

The present disclosure relates to an engine having an exhaust system with a plurality of diesel particulate filters, and more particularly to an exhaust system with improved regeneration of the diesel particulate filters while the engine is experiencing either heavy load conditions or idle load conditions.

BACKGROUND

Many modern diesel engines have an exhaust system that features at least one diesel particulate filter. The diesel particulate filter is utilized to collect particulate matter, often referred to as "soot," that is generated during the combustion of fuel by the engine. After a period of engine operation, the diesel particulate filter needs to be regenerated in order to continue to function as intended. During regeneration, the temperature of the diesel particulate filter is raised such that particulate matter within the filter is combusted. During heavy engine load conditions, the temperature of exhaust gas is already high, thus further increasing the temperature of the exhaust gas during regeneration may cause damage. Alternatively, during idle loading conditions, the temperature of the exhaust gas may not be high enough to ignite fuel that may be injected into the diesel particulate filter that is used to combust the particulate matter within the filter. Therefore, a need exists for an exhaust system that allows regeneration of a diesel particulate filter at high engine load conditions that does not raise exhaust gas temperatures above a certain temperature, but that also produces exhaust gas temperatures that allows regeneration of a diesel particulate filter at idle loading conditions.

SUMMARY

According to one embodiment, an exhaust system for an internal combustion engine comprises a turbocharger, an exhaust pipe, a first diesel particulate filter, a second diesel particulate filter, and a flow control valve. The exhaust pipe has a first portion, a second portion, and a third portion. At least the second portion of the exhaust pipe comprises a plurality of fluid paths. The first diesel particulate filter is coupled to on one of the plurality of fluid paths between the second portion and the third portion of the exhaust pipe. The second diesel particulate filter is coupled to another of the plurality of fluid paths. The flow control valve is disposed within the second portion of the exhaust pipe. The flow control valve is response to an input signal indicative of an operating condition and is configured to control exhaust flow to the first diesel particulate filter and the second diesel particulate filter in response to the input signal.

According to one process, a method of regenerating a diesel particulate filter while an engine is operating under a normal load is provided. An exhaust pipe is provided in fluid communication with exhaust from an engine. The exhaust pipe has a first portion, a second portion, and a third portion. At least the second portion of the exhaust pipe comprises a plurality of fluid paths. A first diesel particulate filter and a second diesel particulate filter are provided. The first diesel particulate filter is coupled to one of the plurality of flow paths. The second diesel particulate filter is coupled to another of the plurality of fluid flow paths. The first and second diesel particulate filters form generally parallel flow paths for exhaust gas. Exhaust flow is directed using a flow control valve disposed in the second portion of the exhaust pipe to the first diesel particulate filter and the second diesel particulate filter. Fuel is delivered to one of either the first diesel particulate filters and the second diesel particulate filter with a fuel dosing input. Exhaust gas mixes downstream of the first diesel particulate filter and the second diesel particulate filter with an exhaust mixer.

According to another process, a method of regenerating a diesel particulate filter while an engine is operating under an idle load is provided. An exhaust pipe is provided in fluid communication with exhaust from an engine. The exhaust pipe has a first portion, a second portion, and a third portion. At least the second portion of the exhaust pipe comprise a plurality of fluid paths. A first diesel particulate filter and a second diesel particulate filter are provided. The first diesel particulate filter is coupled to one of the plurality of flow paths. The second diesel particulate filter is coupled to another of the plurality of fluid flow paths. The first and second diesel particulate filters form generally parallel flow paths for exhaust gas. Exhaust flow is directed using a flow control valve disposed in the second portion of the exhaust pipe to one of the first diesel particulate filter and the second diesel particulate filter. Fuel is delivered with a fuel dosing input to the one of the first diesel particulate filters and the second diesel particulate filter that exhaust flow is directed.

BRIEF DESCRIPTION OF THE DRAWINGS

FIG. 1 is a schematic diagram showing an engine having an exhaust system with a plurality of diesel particulate filters.

DETAILED DESCRIPTION

FIG. 1 shows an engine 10 having an exhaust system 12. The engine 10 is disposed in fluid communication with a fuel reservoir 14 via fuel supply line 16a and fuel return line 16b.

The exhaust system 12 has a plurality of diesel particulate filters ("DPFs") including a first DPF 18a and a second DPF 18b. The exhaust system 12 includes an exhaust manifold 20, and a turbocharger 22 disposed in fluid communication with the exhaust manifold 20. The turbocharger 22 may be directly connected to the exhaust manifold 20. Exhaust flows from the turbocharger 22 via a first portion 24a of an exhaust pipe 24. The first portion 24a of the exhaust pipe 24 runs from an outlet of the turbocharger 22 to a flow control valve 26.

The flow control valve 26 is adapted to control the flow of exhaust to a second portion 24b of the exhaust pipe 24. The second portion 24b of the exhaust pipe 24 forms a plurality of fluid flow paths. As shown in FIG. 1, the second portion 24b of the exhaust pipe is generally Y-shaped and forms a first passage leading to the first DPF 18a and a second passage leading to the second DPF 18b. The flow control valve 26 may be positioned to generally three positions to allow exhaust gas to flow in generally three ways: to both the first DPF 18a and the second DPF 18b; to the first DPF 18a; or the second DPF 18b.

The exhaust system 12 includes a turbocharger bypass 28 that connects the exhaust manifold 20 to the second portion 24b of the exhaust pipe 24. The turbocharger bypass 28 includes a bypass valve 30 that is adapted to allow exhaust gas to flow to either the first DPF 18a, or the second DPF 18b without passing through the turbocharger 22. The bypass valve 30 may also be closed to prevent exhaust that has not passed through the turbocharger 22 from entering the first DPF 18a and the second DPF 18b. Exhaust that passes through the turbocharger bypass 28 generally has a higher temperature than exhaust that passes through the turbocharger 22.

The second portion 24b of the exhaust pipe 24 additionally has a first fuel dosing input 32a and a second fuel dosing input 32b. The fuel dosing inputs 32a, 32b are adapted to supply fuel from the fuel reservoir 14 to the exhaust system 12 during regeneration of the first DPF 18a, and the second DPF 18b to assist in combusting the particulate matter during the regeneration.

Downstream of the first DPF 18a and the second DPF 18b of the exhaust system 12 is a third portion 24c of the exhaust pipe 24. The third portion 24c of the exhaust pipe 24 recombines the exhaust flow from the first DPF 18a and the second DPF 18b. The third portion 24c of the exhaust pipe 24 is also generally Y-shaped. The third portion 24c of the exhaust pipe 24 runs to an exhaust mixer 34. The exhaust mixer 34 is adapted to cause turbulent flow such that exhaust that has passed through the first DPF 18a mixes thoroughly with exhaust gas that has passed through the second DPF 18b. Therefore, exhaust leaving the exhaust mixer 34 will generally be of the average temperature of exhaust passing through the first DPF 18a, and the second DPF 18b when exhaust is flowing through both DPFs 18a, 18b.

While the engine 10 is operating normally, exhaust gas flows from the exhaust manifold 20 through the turbocharger 22 and into the first portion 24a of the exhaust pipe 24. The flow control valve 26 is positioned to allow exhaust gas to flow to both the first DPF 18a and the second DPF 18b from the second portion 24b of the exhaust pipe 24. The turbocharger bypass valve 30 is closed during normal engine operation, such that no exhaust flows through the turbocharger bypass 28. Additionally, no fuel is provided to the fuel dosing inputs 32a, 32b during normal engine operations.

During regeneration of the first DPF 18a when the engine is operating under normal or higher loads, exhaust gas flows from the turbocharger 22 and into the first portion 24a of the exhaust pipe 24. The flow control valve 26 is positioned to allow exhaust gas to flow to both the first DPF 18a and the second DPF 18b from the second portion 24b of the exhaust pipe 24. The turbocharger bypass valve 30 is positioned to allow exhaust to flow to the first DPF 18a via the turbocharger bypass 28. Fuel is provided to the first DPF 18a from the fuel reservoir 14 from the first fuel dosing input 32a. The fuel that enters the first DPF 18a from the first fuel dosing input 32a ignites and raises the temperature within the first DPF 18a such that particulate matter within the first DPF 18a combusts. The exhaust from the first DPF 18a mixes with the exhaust from the second DPF 18b within the exhaust mixer 34, such that at the temperature of exhaust at an output of the exhaust mixer is generally the average temperature of the exhaust from the first DPF 18a and the second DPF 18b. Therefore, the temperature of the exhaust leaving the mixer 34 is significantly lower than the exhaust leaving the first DPF 18a.

During regeneration of the second DPF 18b when the engine is operating under normal or higher loads, exhaust gas flows from the turbocharger 22 and into the first portion 24a of the exhaust pipe 24. The flow control valve 26 is positioned to allow exhaust gas to flow to both the first DPF 18a and the second DPF 18b from the second portion 24b of the exhaust pipe 24. The turbocharger bypass valve 30 is positioned to allow exhaust to flow to the second DPF 18b via the turbocharger bypass 28. Fuel is provided to the second DPF 18b from the fuel reservoir 14 from the second fuel dosing input 32b. The fuel that enters the second DPF 18b from the second fuel dosing input 32b ignites and raises the temperature within the second DPF 18b such that particulate matter within the second DPF 18b combusts. The exhaust from the first DPF 18a mixes with the exhaust from the second DPF 18b within the exhaust mixer 34, such that at the temperature of exhaust at an output of the exhaust mixer is generally the average temperature of the exhaust from the first DPF 18a and the second DPF 18b. Therefore, the temperature of the exhaust leaving the mixer 34 is significantly lower than the exhaust leaving the second DPF 18b.

During regeneration of the first DPF 18a when the engine is operating under idle or light loads, exhaust gas flows from the turbocharger 22 and into the first portion 24a of the exhaust pipe 24. The flow control valve 26 is positioned to allow exhaust gas to flow to only the first DPF 18a from the second portion 24b of the exhaust pipe 24. The turbocharger bypass valve 30 is positioned to allow exhaust to flow to the first DPF 18a via the turbocharger bypass 28. As exhaust is only flowing through the first DPF 18a, additional back pressure formed within the exhaust pipe 24 raises the temperature of the exhaust, and causes additional flow through the turbocharger bypass 28, additionally raising the temperature of the exhaust gas within the first DPF 18a. Fuel is provided to the first DPF 18a from the fuel reservoir 14 from the first fuel dosing input 32a. The fuel that enters the first DPF 18a from the first fuel dosing input 32a ignites and raises the temperature within the first DPF 18a such that particulate matter within the first DPF 18a combusts. The use of the flow control valve 26 and the turbocharger bypass 28 raises the temperature of the exhaust within the first DPF 18a to a sufficiently high temperature to ignite the fuel from the first fuel dosing input 32a even during idle loading.

Similarly, during regeneration of the second DPF 18b when the engine is operating under idle or light loads, exhaust gas flows from the turbocharger 22 and into the first portion 24a of the exhaust pipe 24. The flow control valve 26 is positioned to allow exhaust gas to flow to only the second DPF 18b from the second portion 24b of the exhaust pipe 24. The turbocharger bypass valve 30 is positioned to allow exhaust to flow to the second DPF 18b via the turbocharger bypass 28. As exhaust is only flowing through the second DPF 18b, additional back pressure formed within the exhaust pipe 24 raises the temperature of the exhaust, and causes additional flow through the turbocharger bypass 28, additionally raising the temperature of the exhaust gas within the second DPF 18b. Fuel is provided to the second DPF 18b from the fuel reservoir 14 from the second fuel dosing input 32b. The fuel that enters the second DPF 18b from the second fuel dosing input 32b ignites and raises the temperature within the second DPF 18b such that particulate matter within the second DPF 18b combusts. The use of the flow control valve 26 and the turbocharger bypass 28 raises the temperature of the exhaust within the second DPF 18b to a sufficiently high temperature to ignite the fuel from the second fuel dosing input 32b even during idle loading.

The first and second DPFs 18a, 18b are generally each about 70% the size of a single DPF that would be required for the exhaust system 12.

While two DPFs are shown in FIG. 1, it is contemplated that the number of DPFs used may increase. The greater the number of DPFs utilized in an exhaust system, the smaller each individual DPF may be. For example, if three DPFs are utilized, each DPF is about 60% the size of single DPF that would otherwise be needed, and if four DPFs are utilized, each DPF is about 50% of the size of a single DPF. If more than two DPFs are utilized, additional flow control valves and portions of the exhaust pipe will be required to control the flow of exhaust to specific DPFs. The use of more than two DPFs helps to keep exhaust temperatures from rising to a temperature that may cause damage during high load DPF regeneration, while also ensuring that exhaust temperatures will remain high enough for DPF regeneration to occur under idle loads.

What is claimed is:

1. An exhaust system for an internal combustion engine comprising:
    an exhaust manifold;
    a turbocharger;
    an exhaust pipe disposed in fluid communication with the turbocharger, the exhaust pipe having a first portion, a second portion, and a third portion, at least the second portion of the exhaust pipe comprising a plurality of fluid paths;
    a first diesel particulate filter coupled to a first of the plurality of fluid paths;
    a second diesel particulate filter coupled to a second of the plurality of fluid paths;
    a flow control valve disposed within the second portion of the exhaust pipe, the flow control valve being responsive to an input signal indicative of at least one operating condition and being configurable to direct exhaust flow to the first diesel particulate filter, the second diesel particulate filter, or both the first and second diesel particulate filters in response to the input signal; and
    a Y-shaped turbocharger bypass disposed between the exhaust manifold, the first of the plurality of fluid paths of the second portion of the exhaust pipe, and the second of the plurality of fluid paths of the second portion of the exhaust pipe, the Y-shaped turbocharger bypass having a bypass valve positionable to allow exhaust gas from the exhaust manifold to enter the first of the plurality of fluid paths of the second portion of the exhaust pipe or the second of the plurality of fluid paths of the second portion of the exhaust pipe, or neither the first of the plurality of fluid paths of the second portion of the exhaust pipe nor the second of the plurality of fluid paths of the second portion of the exhaust pipe, without passing through the turbocharger.

2. The exhaust system of claim 1 further comprising a first fuel dosing input disposed in the second portion of the exhaust pipe upstream of the first diesel particulate filter, the first fuel dosing input being in fluid communication with a fuel source.

3. The exhaust system of claim 2 further comprising a second fuel dosing input disposed in the second portion of the exhaust pipe upstream of the second diesel particulate filter, the second fuel dosing input being in fluid communication with a fuel source.

4. The exhaust system of claim 1 further comprising an exhaust mixer disposed in fluid communication with the turbocharger, the exhaust mixer being disposed downstream of the third portion of the exhaust pipe.

5. The exhaust system of claim 1, wherein the first diesel particulate filter is disposed between the second portion and the third portion of the exhaust pipe.

6. The exhaust system of claim 1, wherein the second diesel particulate filter is disposed between the second portion and the third portion of the exhaust pipe.

7. The exhaust system of claim 1, wherein the flow control valve is moveable to a position that prohibits flow to at least one of the first diesel particulate filter and the second diesel particulate filter.

8. A method of regenerating a diesel particulate filter while an engine is operating under a normal load comprising:
    providing an exhaust pipe for receiving at least exhaust from an engine, the exhaust pipe having a first portion, a second portion, and a third portion, at least the second portion of the exhaust pipe comprising a plurality of fluid paths;
    providing a first diesel particulate filter and a second diesel particulate filter the first diesel particulate filter being coupled to one of the plurality of flow paths, and the second diesel particulate filters being coupled to another of the plurality of flow paths, the first and second diesel particulate filters forming generally parallel flow paths for exhaust gas;
    directing exhaust flow using a flow control valve disposed in the second portion of the exhaust pipe to the first diesel particulate filter and the second diesel particulate filter;
    delivering fuel to one of either the first diesel particulate filter and the second diesel particulate filter with a fuel dosing input;
    mixing exhaust gas downstream of the first diesel particulate filter and the second diesel particulate filter with an exhaust mixer;
    providing a Y-shaped turbocharger bypass disposed between the second portion of the exhaust pipe and an exhaust manifold, the Y-shaped turbocharger bypass having a turbocharger bypass valve; and
    directing exhaust from the Y-shaped turbocharger bypass using the turbocharger bypass valve to the diesel particulate filter in which fuel is being delivered by the fuel dosing input
    causing the turbocharger bypass valve to direct exhaust from the Y-shaped turbocharger bypass only to the diesel particulate filter having fuel delivered by the fuel dosing input.

9. A method of regenerating a diesel particulate filter while an engine is operating under an idle load comprising:
    providing an exhaust pipe in fluid communication with exhaust from an engine, the exhaust pipe having a first portion, a second portion, and a third portion, at least the second portion of the exhaust pipe comprising a plurality of fluid paths;
    providing a first diesel particulate filter and a second diesel particulate filter the first diesel particulate filter being coupled to one of the plurality of flow paths between the second portion of the exhaust pipe and the third portion of the exhaust pipe, and the second diesel particulate filters being coupled to another of the plurality of flow paths between the second portion of the exhaust pipe and the third portion of the exhaust pipe, the first and second diesel particulate filters forming generally parallel flow paths for exhaust gas;
    directing exhaust flow using a flow control valve disposed in the second portion of the exhaust pipe to one of the first diesel particulate filter and the second diesel particulate filter;
    delivering fuel with a fuel dosing input to the one of the first diesel particulate filter and the second diesel particulate filter that exhaust flow is directed; and
    providing a Y-shaped turbocharger bypass disposed between the second portion of the exhaust pipe and an exhaust manifold, the Y-shaped turbocharger bypass having a turbocharger bypass valve; and
    directing exhaust from the Y-shaped turbocharger bypass using the turbocharger bypass valve to the diesel particulate filter in which fuel is being delivered by the fuel dosing input.
    causing the turbocharger bypass valve to direct exhaust from the Y-shaped turbocharger bypass only to the diesel particulate filter having fuel delivered by the fuel dosing input.

* * * * *